(No Model.)
R. WIGAN.
PIPE COUPLING.
No. 557,296.                    Patented Mar. 31, 1896.
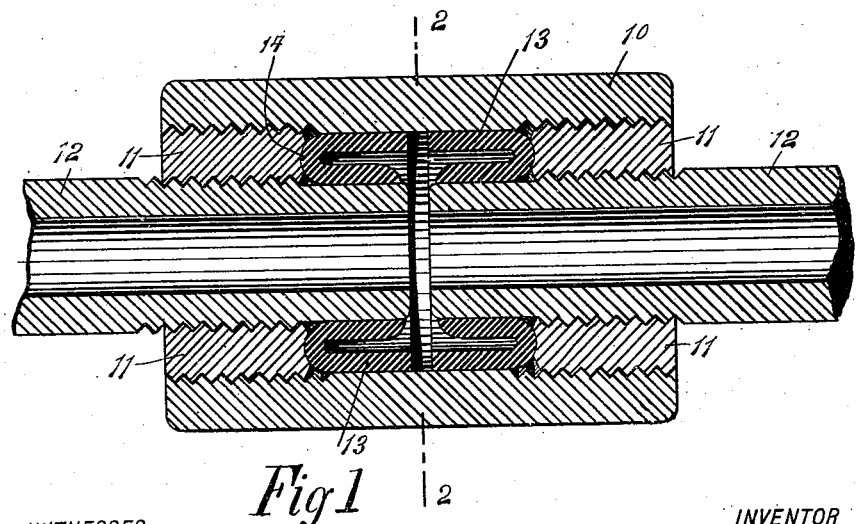
WITNESSES:
Bertram H. Saunders
Edward L. Loman
INVENTOR
Richard Wigan
BY
W. B. Hutchinson
ATTORNEY.

UNITED STATES PATENT OFFICE.

RICHARD WIGAN, OF MANCHESTER, ENGLAND.

PIPE-COUPLING.

SPECIFICATION forming part of Letters Patent No. 557,296, dated March 31, 1896.

Application filed May 20, 1895. Serial No. 549,875. (No model.) Patented in England October 20, 1894, No. 20,027.

*To all whom it may concern:*

Be it known that I, RICHARD WIGAN, a subject of the Queen of Great Britain, residing at Manchester, England, have invented a new and useful Pipe-Coupling, (for which I have obtained a patent in Great Britain, No. 20,027, bearing date October 20, 1894,) of which the following is a full, clear, and exact description.

My invention relates to pipe-couplings, and particularly to couplings for hydraulic pipes in which water is held and conducted under pressure.

The object of my invention is to produce a very cheap and simple coupling which can be quickly and easily applied to a pipe or pipes, which is very strong, which has its packings or gaskets arranged to be acted upon directly by the internal pressure in the pipes, and which is constructed in such a way that the tightness of the joint increases with the internal pressure.

To these ends my invention consists of a pipe-coupling the construction of which will be hereinafter described and claimed.

Reference is to be had to the accompanying drawings, forming a part of this specification, in which similar figures refer to corresponding parts throughout both views.

Figure 1 is a central longitudinal section of my improved coupling as applied to adjacent pipe-sections, and Fig. 2 is a cross-section on the line 2 2 of Fig. 1.

The coupling is provided with a coupling ring or socket 10 to receive the ends of the pipes which it is to connect and to secure a good grip on the pipes, this ring being internally screw-threaded at the ends to receive the bushings 11, which are arranged between it and the pipes 12, each bushing 11 being both internally and externally screw-threaded, so as to connect readily with the ring 10 and the threads on the pipes 12. The inner ends of the pipes 12 extend inward beyond the ends of the bushings 11, as shown clearly in Fig. 1, and between the extreme end portions of the pipes and the coupling-ring 10 are arranged the gaskets 13, which are doubled over in the middle, as shown at 14, thus forming each gasket into a ring which is essentially U-shaped in cross-section, one member of the gasket lying against the ring 10 and the opposite member against the pipe 12. The pipes do not meet at the ends, and a space is also left between the opposite gaskets, so that when the pressure is applied within the pipes the liquid enters between the gaskets 13 and also enters between the opposite members of the gaskets, and consequently the pressure causes the gaskets to be spread so as perfectly pack the joint.

The gaskets are preferably made of leather or rubber; but they may be made of any material having sufficient flexibility to permit the gaskets to be doubled as illustrated, and sufficient strength and resiliency to serve the purpose of a packing.

In applying the coupling the ring 10 and the bushing 11 are screwed on one pipe, the gasket 13 placed in the ring and around the end of the pipe, the two gaskets 13 and bushing 11 placed in the open end of the ring, and the second pipe screwed in the bushing, so that the parts assume the position shown in Fig. 1, and it will be readily seen then that any internal pressure in the pipes tends to spread the gaskets and pack the joint.

To insure a good fit and a nice joint it is desirable to shape the inner ends of the bushings 11 to fit the doubled portions 14 of the gaskets, although it is not absolutely necessary to do so.

It will be observed that the above-described coupling comprises very few parts, that these parts are put together in a very simple and efficient manner, and that consequently a strong coupling can be effected and the coupling can be applied very conveniently to the pipes.

Having thus fully described my invention, what I claim, and desire to secure by Letters Patent, is—

The combination with the pipes threaded near their adjacent ends, of the bushings screwed to the pipes so as to permit the ends of the latter to protrude through the bushings, a coupling-ring screwed to and connecting the bushings and forming a separation of the pipe ends, and the doubled or U gaskets oppositely arranged between the pipe ends and ring with their backs abutting with the bushings, substantially as described.

RICHARD WIGAN.

Witnesses:
 ARTHUR T. HALL,
 JOHN W. THOMAS.